United States Patent [19]

Goto et al.

[11] Patent Number: 5,214,630
[45] Date of Patent: May 25, 1993

[54] OPTICAL HEAD HAVING LIGHT TRANSMISSIVE CARRIAGE

[75] Inventors: Yoshikazu Goto, Hirakata; Benichi Miyazaki, Katano, both of Japan

[73] Assignee: Matsushita Electric Industrial Co., Ltd., Kadoma, Japan

[21] Appl. No.: 635,893

[22] Filed: Jan. 4, 1991

[30] Foreign Application Priority Data

Jan. 10, 1990 [JP] Japan ..................................... 2-3047

[51] Int. Cl.$^5$ .............................................. G11B 7/12
[52] U.S. Cl. .................................. 369/44.14; 369/112
[58] Field of Search ............... 369/44.14, 44.12, 44.11, 369/44.16, 44.28, 112, 44.15, 44.17, 44.18, 44.19, 44.22, 44.23, 44.24, 110; 359/813, 814, 823, 824

[56] References Cited

U.S. PATENT DOCUMENTS 4,866,694  9/1989  Korth ................................. 369/112
4,545,046 10/1985  Jansen et al. ..................... 369/44.16

FOREIGN PATENT DOCUMENTS 62-107442  5/1987  Japan .
1-194848   8/1989  Japan .

*Primary Examiner*—Aristotelis Psitos
*Assistant Examiner*—Muhammad Edun
*Attorney, Agent, or Firm*—Cushman, Darby & Cushman

[57] ABSTRACT

A carriage which is provided with a light beam focusing lens for focusing the light beam on an optical disc is made of light transmissible material, a light reflection part is formed at one end part in one body of the carriage, and a carriage holding mechanism is disposed on both sides in one body thereof so as to be movable in the radial direction of the optical disc, the light beam is applied to the carriage at the other end part thereof.

4 Claims, 12 Drawing Sheets

OPTICAL HEAD HAVING LIGHT TRANSMISSIVE CARRIAGE

FIELD OF THE INVENTION AND RELATED ART STATEMENT

1. Field of the Invention

The present invention relates generally to an optical head for recording or reproducing information on an information track of an optical disc, and more particularly to an optical head which is miniaturized in size.

2. Description of the Related Art

An optical head of an optical disc apparatus comprises an optical system for focusing a laser beam which is emitted from a stationary laser light source on the optical disc. The optical system is provided with an objective lens which is moved in the perpendicular direction with respect to the surface of the optical disc to focus the laser beam and is moved in the radial direction thereof to trace a track by an objective lens driving means. The optical system and the objective lens driving means are mounted on a transfer carriage for moving the optical head to a track to be traced by the optical head. The position of the transfer carriage is detected by a position detecting means.

Recently, a small diameter optical disc of 3.5 inch and below has been introduced in the optical disc apparatus of a computer peripheral equipment in response to miniaturization of a computer apparatus. Hence, it is required to miniaturize and to thin the optical head and to search with a high speed.

An example of the optical head in the prior art is disclosed in the Japanese Published Unexamined Patent Application Sho 64-21728. FIG. 11 is the perspective view of the optical head of the example and FIG. 12 is a partially schematic vertical section of FIG. 11 taken along the line XII—XII.

Referring to FIG. 11 and FIG. 12, a stationary optical equipment 101 comprises a semiconductor laser device for emitting a laser light, a collimator lens for collimating the laser light and a beam splitter for dividing the collimated laser beam to two laser beams in a manner familiar to one skilled in the art, and the two laser beams 101A and 101B are output from the stationary optical equipment 101. The laser beam 101A is reflected by a mirror 104A and is directed to the optical disc 107. On the other hand, the laser beam 101B is reflected by a mirror 104B and is directed to a position sensing device 112 as shown in FIG. 12. The mirror 104A and 104B are mounted on a carriage 103 which is suspended by two shafts 102 so as to move in the direction shown by arrow A. The laser beam reflected by the mirror 104A is focused by an objective lens 106 mounted on an objective lens holder 105 to the surface of the optical disc 107. The objective lens 106 is moved in the perpendicular direction with respect to the optical disc 107 as shown by arrow B.

Referring to FIG. 11, two tracking coils 110 are mounted on the carriage 103, and four focusing coils 109 are mounted on the objective lens holder 105. Two magnetic elements 111, 111 each comprising a magnet 111A and a yoke 111B, are inserted in the respective tracking coils 110 by each yoke 111B. Focusing of the laser beam 101A is accomplished by flowing a current in the focusing coil 109, and tracking control through moving of the carriage 103 along the shafts 102 is accomplished by flowing a current to the tracking coils 110.

According to the example of the prior art, since the optical system comprising the mirror 104A and the objective lens 106 are mounted on the carriage 103 which is suspended by the shafts 102, the height of the optical head is increased by the mechanism comprising the shafts 102 and carriage 103. Therefore, the height of the optical head can not be decreased, and the weight of the moving portion of the optical head can not be decreased to improve the speed of the tracking operation. Moreover, since the mirrors 104A and 104B are fixed on the carriage 103 by adhesive, accurate positioning of the mirrors 104A and 104B to the carriage 103 is not easy. Moreover, the mirrors 104A and 104B are liable to be vibrated during moving of the carriage due to the elastic effect of the adhesive. Such vibration is liable to increase error in recording or reproducing process.

Position detecting means 112 of the carriage 103 in the prior art is disposed under the carriage 103 separately therefrom, and the mirror 104B for reflecting the laser beam 101B to the position detecting means 112 must be mounted on the transfer carriage 103. Consequently, the weight of the carriage 103 is considerably increased, and the height thereof is also increased, and the optical head becomes complex in configuration and is expensive.

OBJECT AND SUMMARY OF THE INVENTION

An object of the present invention is to provide an optical head miniaturized in size.

An optical head in accordance with the present invention comprises:

a stationary optical part having light beam generating means for emitting a collimated light beam and light sensing means for detecting incident light which is separated by a beam splitter, and a carriage for guiding the collimated light beam emitted from the stationary optical part to focusing means mounted thereon, the carriage being made of light transmissible material and provided with holding means for slidably holding the carriage so as to be slidable in the radial direction of an optical disc, and being provided with a reflection part in one body for reflecting the collimated light beam to the surface of the optical disc and for reflecting the light reflected from the surface of the optical disc to the stationary optical part.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1:
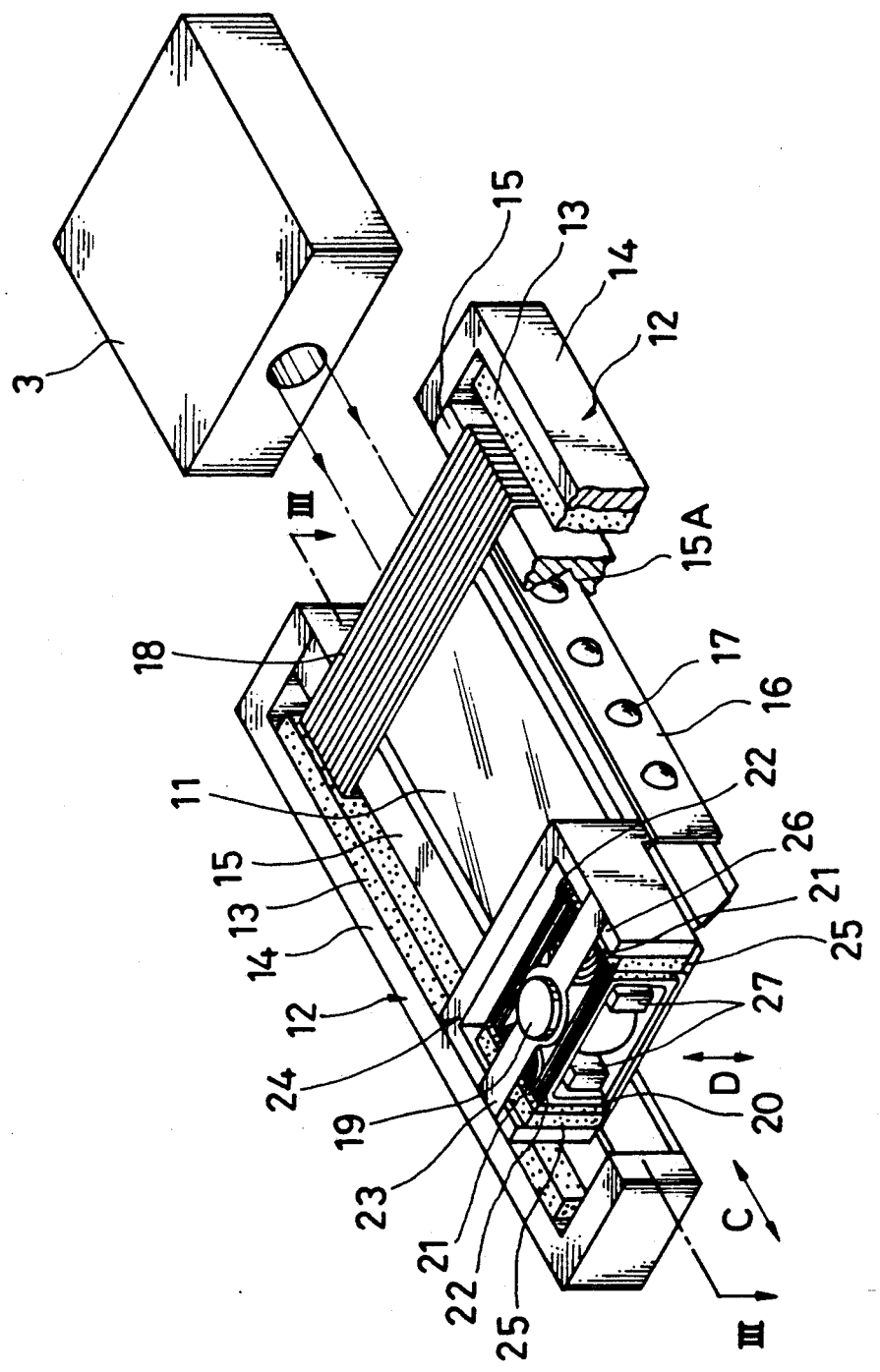
FIG. 1 is a perspective view of a first embodiment of the optical head in accordance with the present invention.
Figure 2:
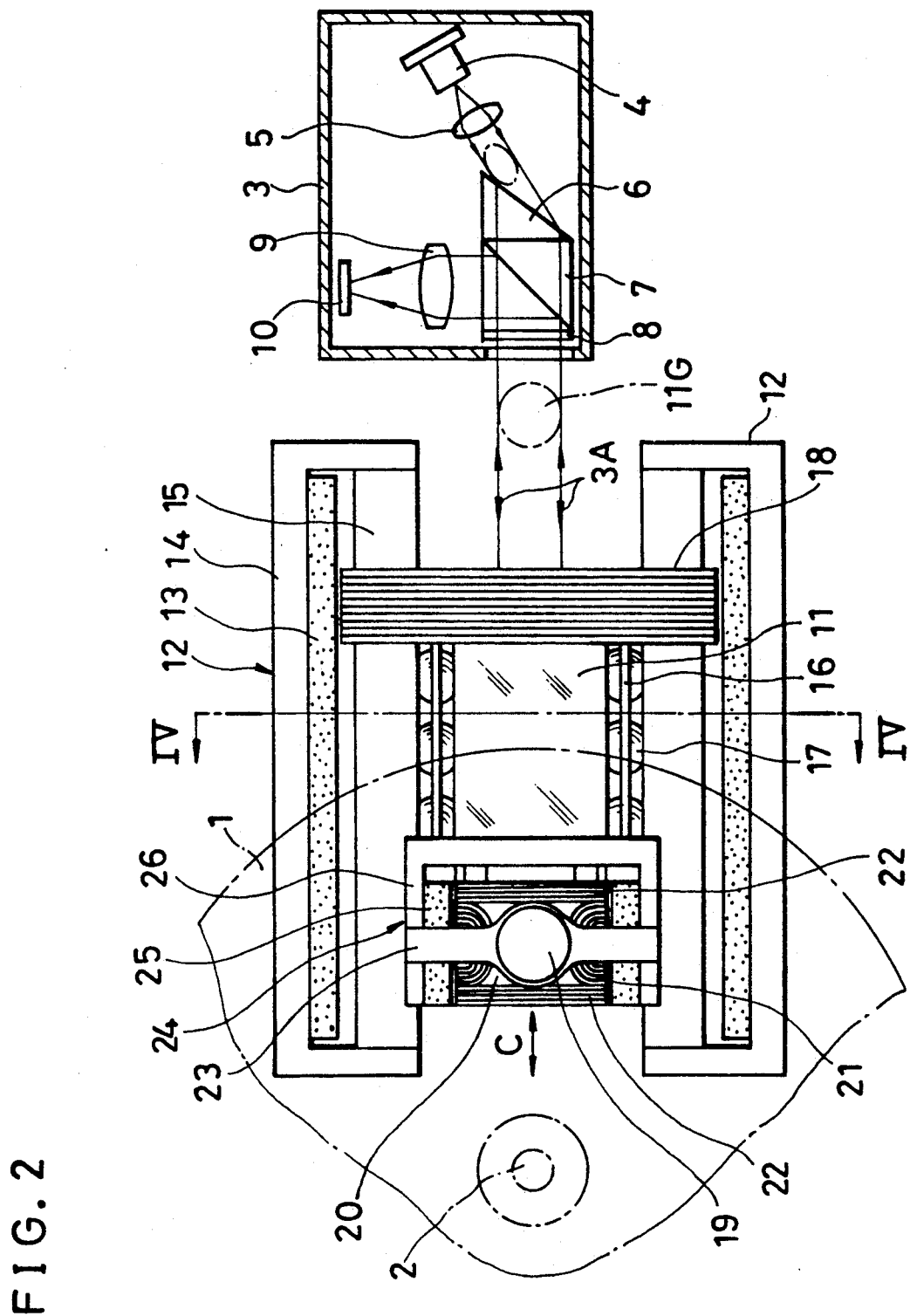
FIG. 2 is a plan view of the first embodiment of the optical head.
Figure 3:
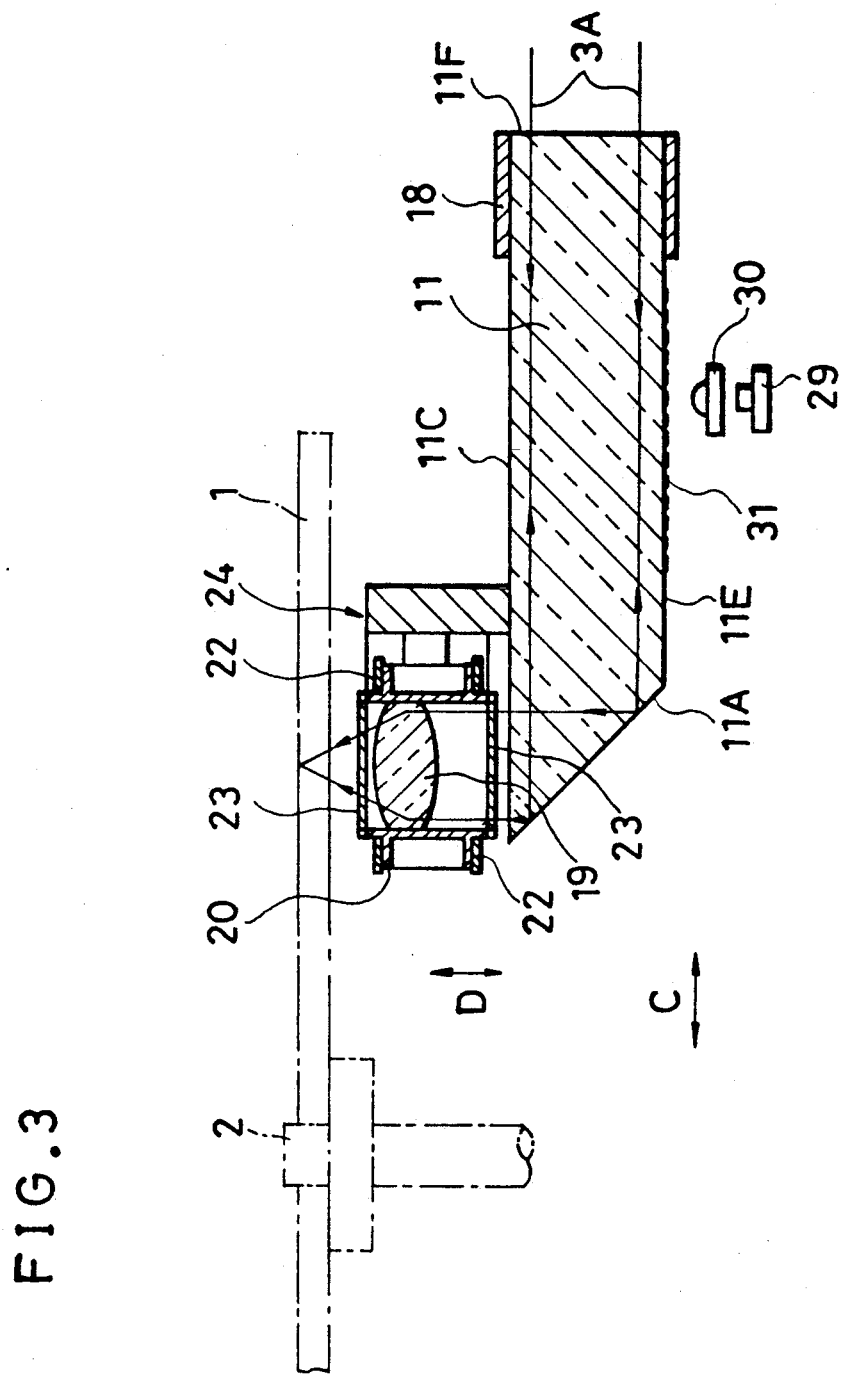
FIG. 3 is a partially schematic vertical section of FIG. 2 taken along the line III—III.

FIG. 1 is the perspective view of a first embodiment of an optical head in accordance with the present invention, FIG. 2 is the plan view thereof and FIG. 3 is a partially schematic vertical section of FIG. 1 taken along the line III—III.

Referring to FIG. 1, FIG. 2 and FIG. 3, an optical disc 1 having a spiral information track or a plurality of concentric information tracks is mounted on a turntable 2 and is rotated by a driving means which is not shown in these figures. A stationary optical part 3 comprises a semiconductor laser generator 4 which emits a laser light beam of an oval section, a collimator lens 5 for collimating the laser light beam from the semiconductor laser generator 4 into a parallel light beam having a cross-section of an oval, the ellipticity of the oval is about 2-3, and the major axis of the oval is perpendicular to the paper surface of FIG. 2. A prism 6 changes the cross-sectional shape of the laser light beam of the oval section to a circular section. The stationary optical part 3 further comprises a polarizing beam splitter 7 for polarizing the laser light beam, a quarter-wave plate 8, a lens 9 for focusing a laser light beam reflected by the polarizing beam splitter 7 and a light sensor 10 for detecting the focused laser light beam focused by the lens 9.

Figure 4:
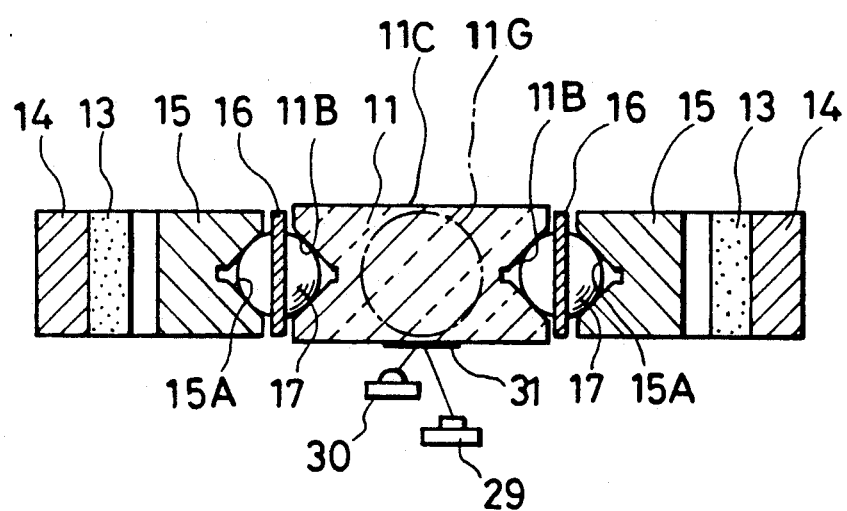
FIG. 4 is a partially schematic vertical section of FIG. 2 taken along the line IV—IV.

A carriage 11 is made of light transmitting material such as plastics or glass and has V-shaped slots 11B having smooth surfaces on both the sides thereof as shown in FIG. 4. One end of the carriage 11 is formed as an oblique plane 11A with respect to the upper surface 11C thereof as shown in FIG. 3. The oblique plane 11A serves as a reflection part. The other end of the carriage has a vertical plane 11F which is vertical to the plane of the upper surface 11C. Referring to FIG. 1 and FIG. 2, a magnetic element 12 comprising a long-plate-shaped magnet 13, a back yoke 14 for holding the magnet 13 and a yoke 15 is disposed near both the sides of the carriage 11. The yoke 15 has a V-section slot 15A on the side facing to the side of the carriage 11 as shown in FIG. 4. A plurality of steel balls 17 which are held by a retainer 16 are inserted between the V-section slot 15A of the yoke 15 and the V-shaped slot 11B of the carriage 11. The circle 11G of FIG. 4 represents shape of the section of the incident laser light beam 3A. Thus the carriage 11 is held by such a linear guide mechanism as mentioned above so as to be movable in the radial direction of the optical disc 1.

Referring to FIG. 1, a transfer coil 18 is mounted on the carriage 11 at the part of the afore-mentioned other end having the vertical plane 11F, and two end parts of the transfer coil 18 are inserted in the respective slots of the magnet elements 12. The magnetic element 12 and the carriage 11 having the transfer coil 18 constitute a linear motor. The carriage 11 is moved by a current flowing in the transfer coil 18.

A magnetic element 24 is mounted on the upper surface of the carriage 11. The magnetic element 24 comprises a back yoke 26, two yokes 27 and two magnets 25. An objective lens holder 20 for holding an objective lens 19 is suspended by two rubber suspensions 23 at both the upper and lower ends of the objective lens holder 20 as shown in FIG. 1 and FIG. 2. Two focusing coils 21 and two tracking coils 22 are mounted on the objective lens holder 20. The objective lens holder 20 is moved in the radial direction of the optical disc 1 by the tracking coil 22 as shown by arrow C, and is moved in the axial direction of the objective lens 19 by the focus coil 21 as shown by arrow D within 0.5 mm, for example.

Referring to FIG. 3, an optical lattice 31 having a plurality of slit patterns of a constant interval is formed on the lower surface 11E of the carriage 11. A light generating device 29 is disposed under the optical lattice 31, and the emitted light is applied thereto, and the reflected light from the optical lattice 31 is sensed by a light sensing device 30 which is also disposed under the carriage 11.

Operation of the first embodiment is elucidated hereafter. A laser light beam having a circular cross-section is emitted from the stationary optical part 3 and incidents to the carriage 11 at the surface 11F. The incident laser light beam 3A is reflected by the oblique plane 11A of the carriage 11 and is applied to the objective lens 19 as shown in FIG. 3. The laser light beam 3A is focused by the objective lens 19 and is applied to a track of the optical disc 1. The reflected light from the optical disc 1 is collimated by the objective lens 19 and is also reflected by the oblique plane 11A. Then the light beam is returned to the stationary optical part 3 through the carriage 11. The light beam passes the quarter-wave plate 8 and is reflected to the light sensor 10 by the polarizing beam splitter 7. The reflected light beam is focused by the lens 9 and is sensed by the light sensor 10. The output signal of the light sensor 10 is used for reading out information and for controlling focusing and tracking.

The optical disc 1 has, large or small, axial deflection or eccentricity of the revolution center relative to the center of the optical disc 1, therefore, in order to trace a track with the light beam, focus control and tracking control are required. For making the above-mentioned control, a focus driving current is generated on the basis of the output signal of the light sensor 10 and is applied to the focus coil 21. Thereby the objective lens holder 20 is moved to the direction shown by the arrow D in FIG. 1 and FIG. 3 by the effect of the magnetic element 24. On the other hand, a tracking driving current is also generated on the basis of the output signal of the light sensor 10 and is applied to the tracking coil 22. The objective lens holder 20 is driven so that the objective lens 19 traces a predetermined track of the optical disc 1. Track search of the optical head is performed by applying a track search current to the transfer coil 18.

According to the first embodiment, since the reflection mirror 11D is made in one body with the carriage 11, positional relation between the carriage 11 and the reflection mirror 11D is always correctly maintained and is not varied by vibration. Consequently, stability in the focus control and tracking control is improved, and error in recording process and/or the reproducing process is reduced.

Track search operation of the optical head is elucidated hereafter. When a current is applied to the transfer coil 18 of the carriage 11, the carriage 11 is moved in the radius direction of the optical disc 1 as shown by the arrow C in FIGS. 1, 2 and 3, and a predetermined track is searched. In general, the search operation is performed by reading out an address of the optical disc 1, and a method for detecting the position or speed of the carriage 11 is usable in order to accomplish rapid search operation. In the first embodiment, the position of the carrier 11 is detected by sensing the optical lattice 31 which is formed on the lower surface of the carriage 11 by the optical sensor 30 which is disposed under the carriage 11. A velocity signal is generated on the basis of a position detecting signal detected by the optical sensor 30, and the velocity signal is fed back to the search control loop of the carriage 11. Thereby, stability of the search operation is accomplished.

As mentioned above, according to the first embodiment, since the carriage 11 is made of light transparent material for transmitting the laser light beam 3A which is emitted from the stationary optical part 3, and since the reflection part is made in one body with the carriage 11, the height of the carriage 11 is reduced and the weight thereof is also lightened. Consequently, the thickness of the optical disc driving apparatus is reduced, and high speed search is realizable.

Figure 5:
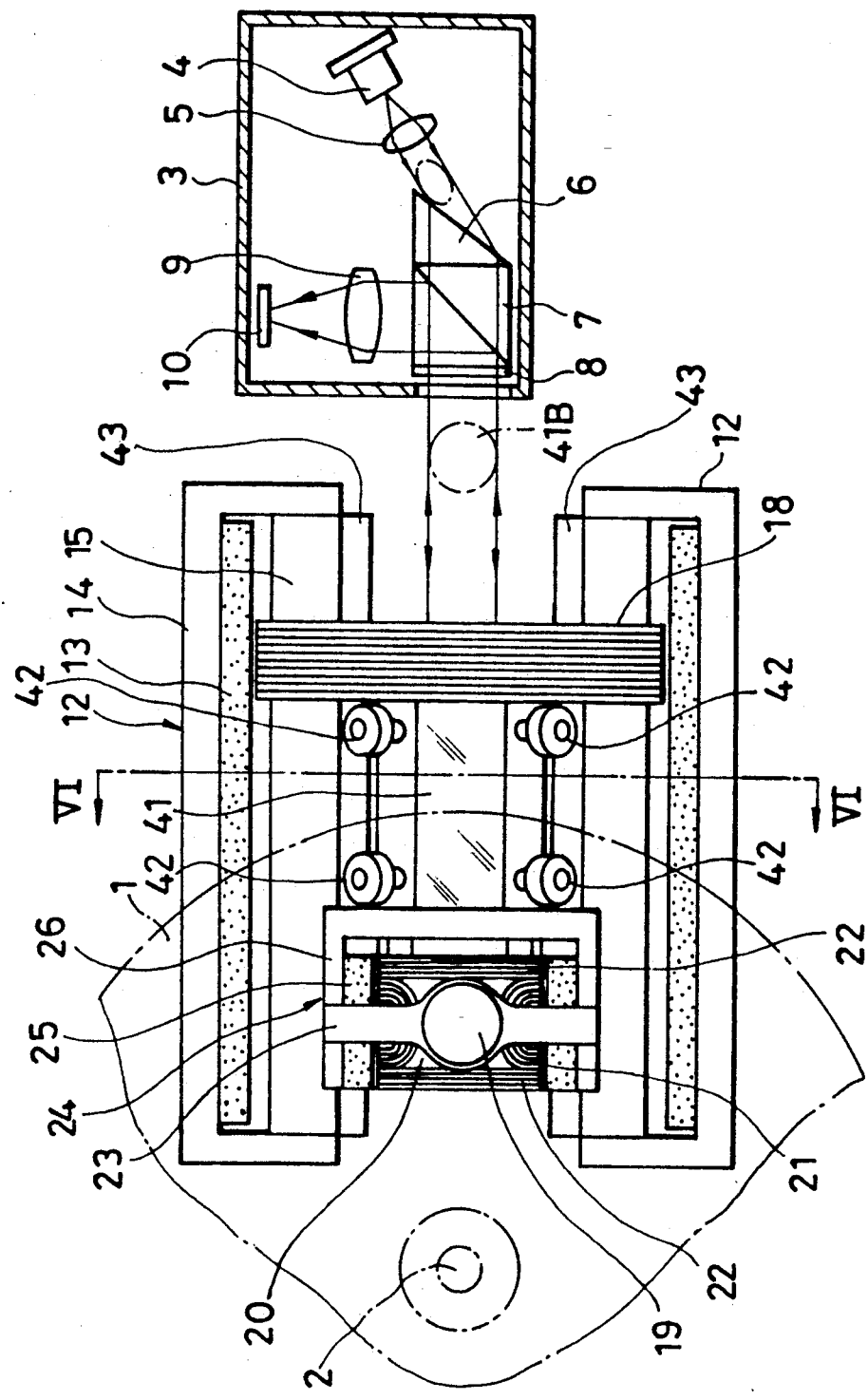
FIG. 5 is a plan view of a second embodiment of the optical head in accordance with the present invention.
Figure 6:
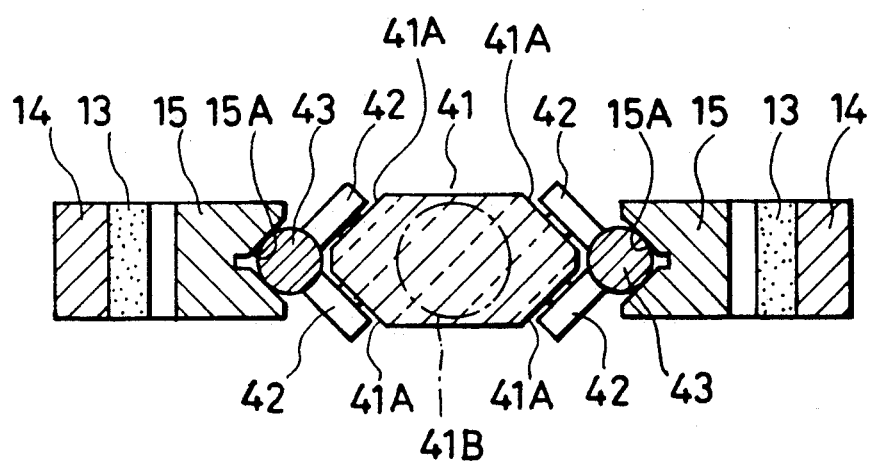
FIG. 6 is a partially schematic vertical section of FIG. 5 taken along the line VI—VI.

FIG. 5 is the plan view of a second embodiment of the optical head in accordance with the present invention, and FIG. 6 is a partially schematic vertical section of FIG. 5 taken along the line VI—VI. Referring to FIG. 6, a carriage 41 of a hexagonal cross-section is provided with eight rollers 42 on oblique four sides 41A. These rollers 42 are held by two guide rails 43 which are mounted in slots 15A of the yokes 15. The carriage 41 is movable to the radial direction of the optical disc 1 along the guide rails 43. A circle 41B represents the section of the laser light beam which incidents to the carriage 41. In FIG. 5 and FIG. 6, elements similar to the elements of FIG. 1, FIG. 2 and FIG. 3 are identified by like numerals.

According to the second embodiment, since the carriage 41 of transparent material is suspended by the plural rollers 42, no balls such as the ball 17 as shown in FIG. 4 of the first embodiment revolve on the surfaces of the oblique sides 41A. Therefore, smooth surfaces are not necessary on the oblique four sides 41A of the carriage 41.

Figure 7:
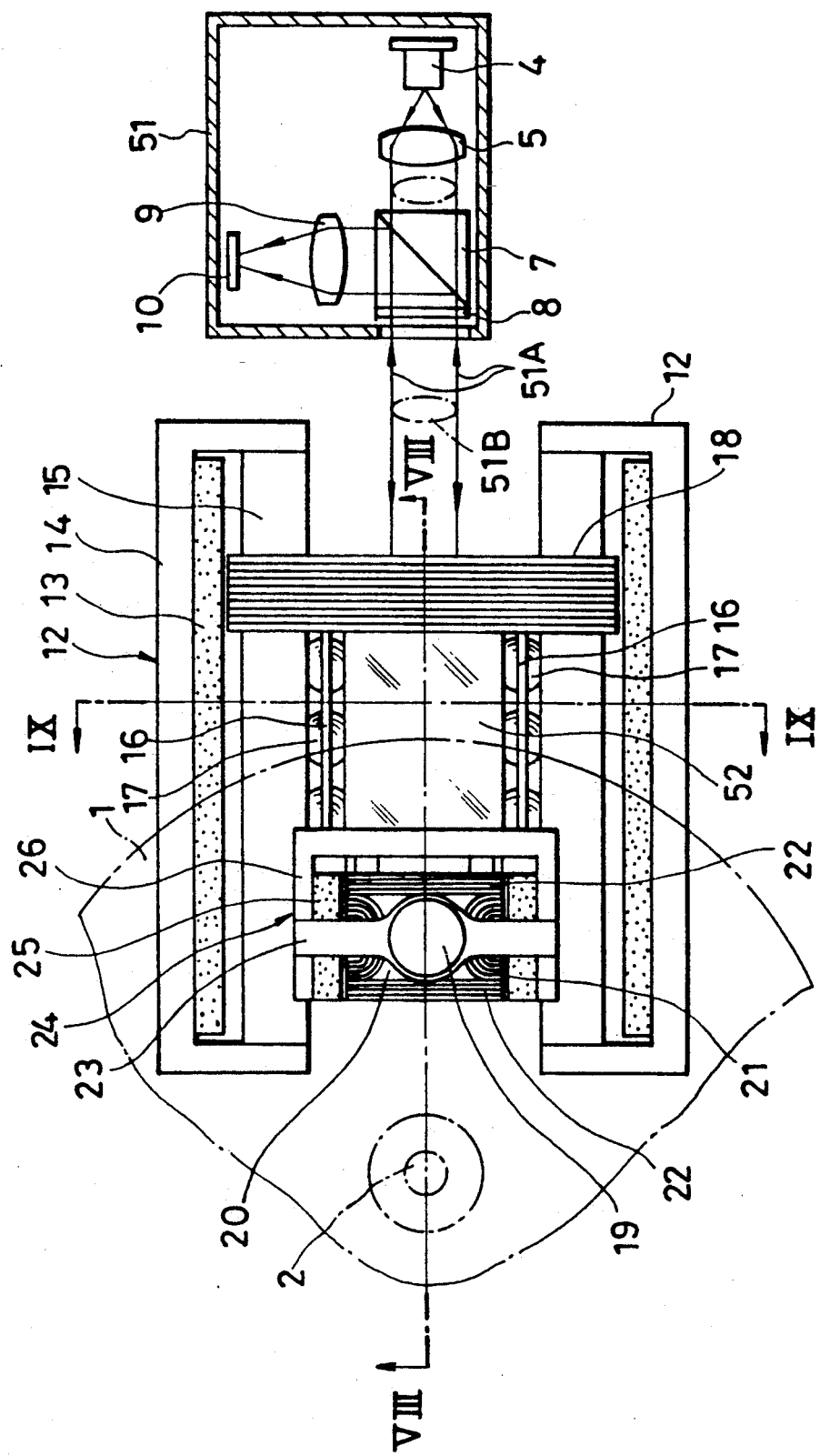
FIG. 7 is a plan view of a third embodiment of the optical head in accordance with the present invention.
Figure 8:
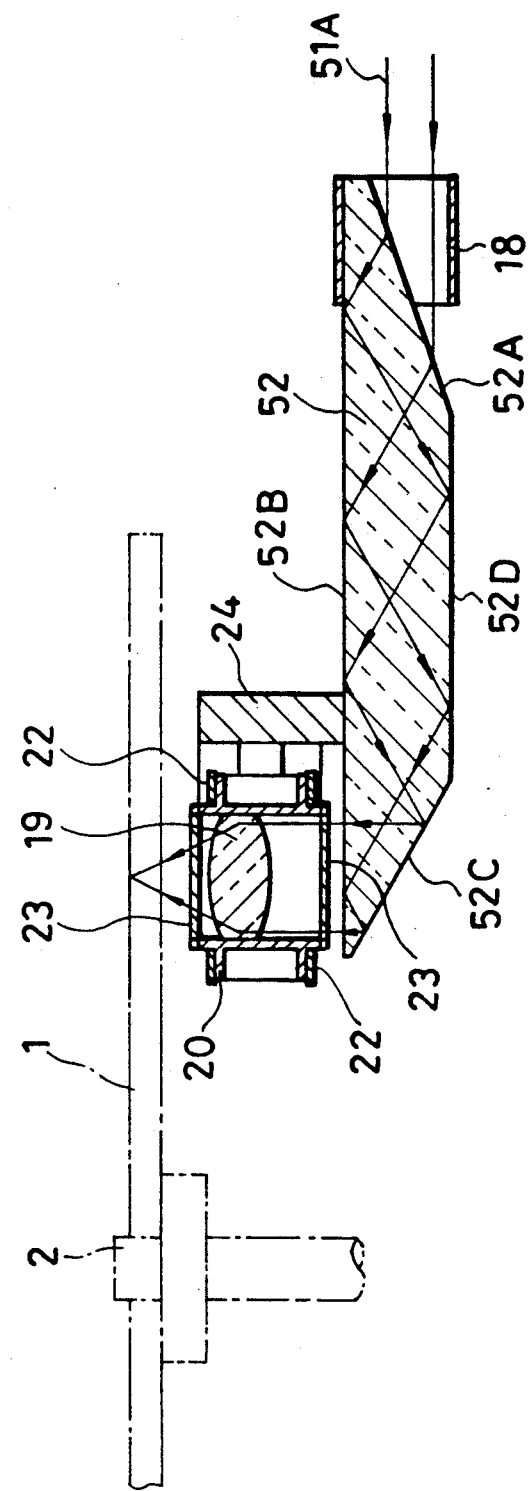
FIG. 8 is a partially schematic vertical section of FIG. 7 taken along the line VIII—VIII.

FIG. 7 is the plan view of a third embodiment of the optical head in accordance with the present invention. In the third embodiment, a stationary optical part 51 outputs a laser light beam 51A having an oval section. The major axis of the oval section is parallel to the paper surface of FIG. 7. Referring to FIG. 7, the stationary optical part 51 comprises a semiconductor laser device 4 for emitting a laser light beam having an oval section, a collimator 5 for collimating the laser light beam, and a beam splitter 7 for reflecting an incident light to the light sensor 10. The emitted light beam from the semiconductor laser device 4 is collimated to a laser light beam of an oval section. FIG. 8 is a partially schematic vertical section of FIG. 7 taken along the line VII—VII. The carriage 52 made of transparent material has oblique-cut light incident ends 52A besides the oblique face of reflection part 52C. The other oblique surface 52A serves as a reforming optical part which changes shape of the section of the light beam. The light beam 51A output from the stationary optical part 51 is applied to the oblique light incident surface 52A as shown in FIG. 8. The incident light beam of the carriage 52 is transmitted to the reflection part 52C by reflecting between the upper surface 52B and the lower surface 52D of the carriage 52. The light beam is finally reflected upward by the reflecting part 52C and is applied to the focusing lens 19. The light beam 51A of the oval section is converted to the light beamof a circular section when the light beam 51A goes into the oblique surface 52A of the carriage 52. Other configuration and operation are similar to that of FIG. 1 and FIG. 2.

Figure 9:
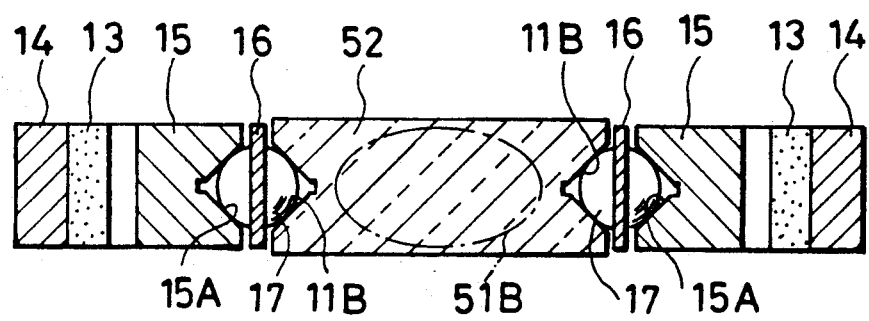
FIG. 9 is a partially schematic vertical section of FIG. 7 taken along the line IX—IX.

FIG. 9 is a vertical sectional partial view of the apparatus of FIG. 7 taken along the line IX—IX. A circle 51B represents the section of the light beam 51A which is applied to the carriage 52.

According to the third embodiment, since the oval-sectioned light beam of the oval section having the major axis in horizontal direction is emitted from the stationary optical part 51 and is applied to the carriage 52, the height of the carriage 52 can be further reduced than that of the first and second embodiments. Consequently, the height of the optical head is considerably reduced.

Figure 10:
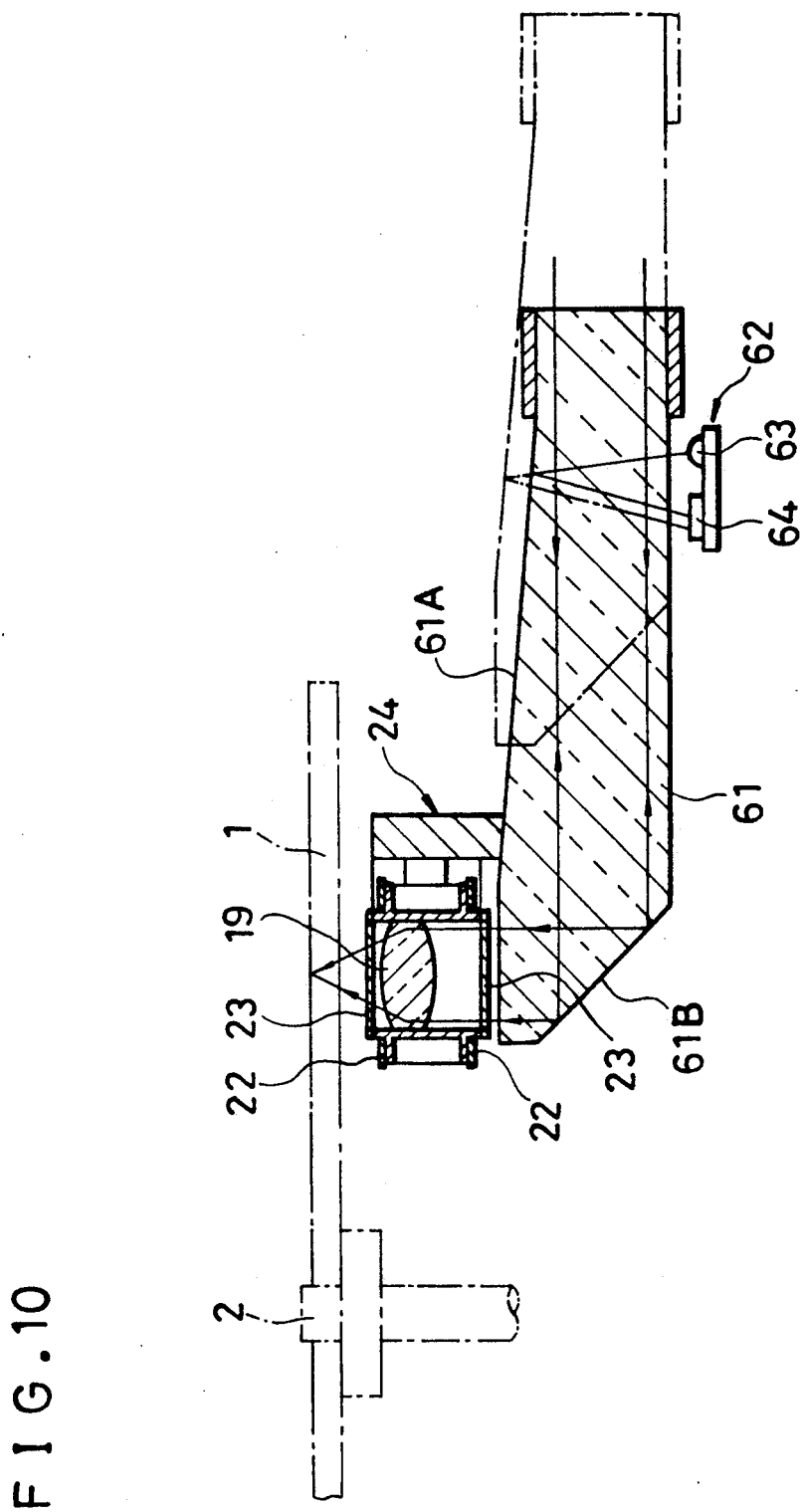
FIG. 10 is a side view of a fourth embodiment of the optical head in accordance with the present invention.
Figure 11:
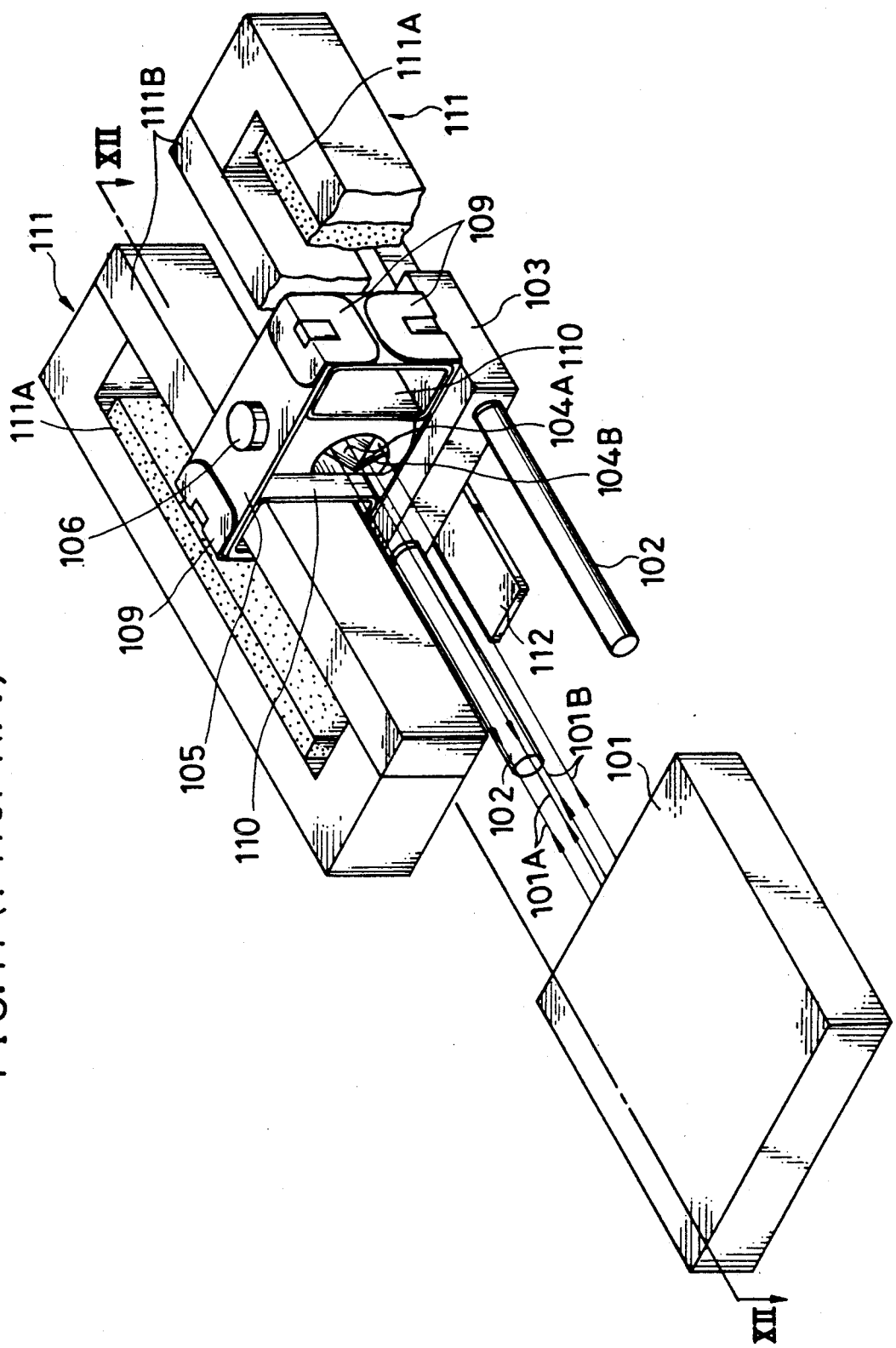
FIG. 11 is the perspective view of the optical head in the prior art.
Figure 12:
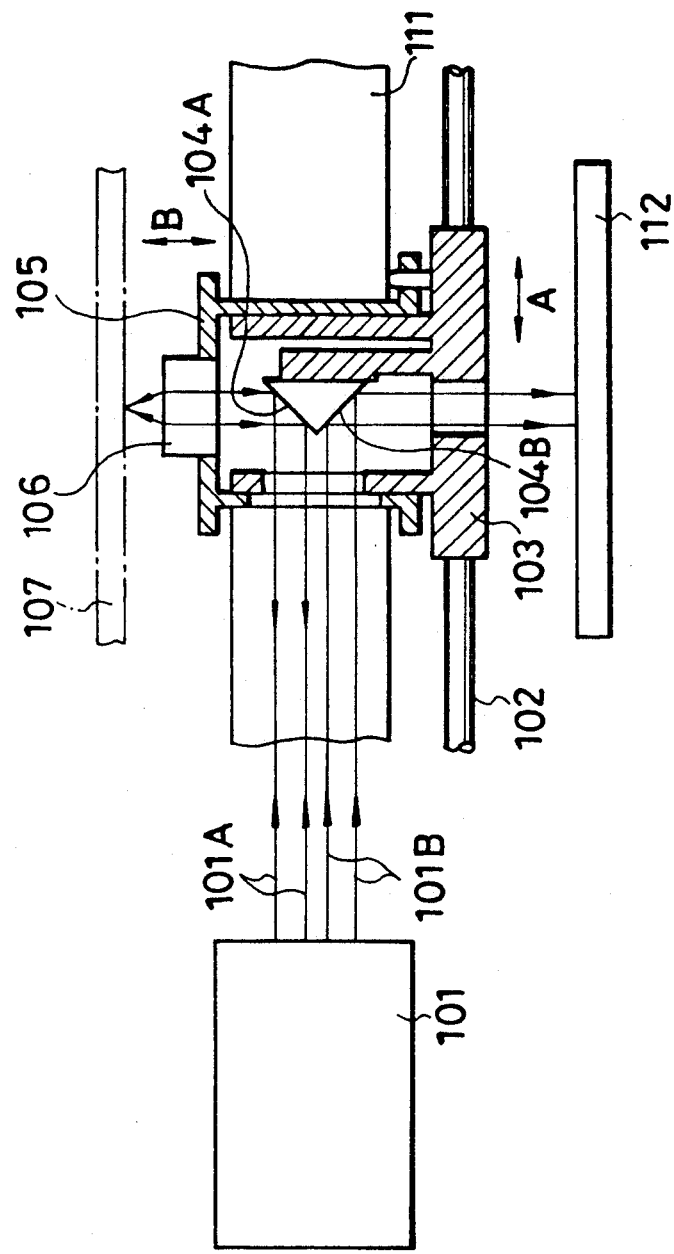
FIG. 12 is the partially schematic vertical section of FIG. 11 taken along the line XII—XII.

FIG. 10 is a side section view of a fourth embodiment of the optical head in accordance with the present invention. Referring to FIG. 10, the upper surface 61A of a carriage 61 slopes along the moving direction of the carriage 61, and is plated with light reflection metal such as aluminum. A light emitting device 63 and a light receiving device 64 are disposed under the carriage 61, and the light emitted from the light emitting device 63 is reflected by the upper surface 61A of the carriage 61 and is sensed by the light receiving device 64. The intensity of the received light by the light receiving device 64 varies in proportional to the distance of the light path from the light emitting device 63 to the light receiving device 64. Consequently, the position of the carriage 61 is detected on the basis of the light intensity which is detected by the light receiving device 64. Other configuration and operation in the fourth embodiment is identical with that of the first and the second embodiments.

According to the fourth embodiment, the position of the carriage 61 is detected without such position detecting means as the optical lattice 31 in the first embodiment.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An optical head comprising:
   a stationary optical part having a light beam generating means for emitting a collimated light beam and light sensing means for detecting incident light which is separated by a beam splitter, and
   a carriage for guiding said collimated light beam emitted from said stationary optical part to focusing means mounted thereon, said carriage means having an incident surface at an end thereof that is perpendicular to an optical path of said collimated light beam, and said carriage being made of light transmissive material and provided with holding means for slidably holding said carriage so as to be slidable in the radial direction of an optical disc, and being provided with a reflection part in one body for reflecting said collimated light beam to the surface of said optical disc and for reflecting the light reflected from the surface of the optical disc to the stationary optical part.

2. An optical head in accordance with claim 1, wherein said carriage is provided with optical means on said incident surface for reforming a shape of the section of the light beam incident thereon.

3. An optical head in accordance with claim 1, wherein slit patterns are formed on a surface of said carriage to represent a position of said carriage, and a stationary light source and light sensing means are disposed adjacent to the carriage to detect said slit patterns and thereby said position of said carriage.

4. An optical head in accordance with claim 1, wherein on side face of said carriage slopes along the moving direction of said carriage, and a stationary light source and light sensing means are disposed adjacent to the carriage to detect said sloped side face and thereby a position of said carriage.

* * * * *